(12) United States Patent
Yamada et al.

(10) Patent No.: US 9,044,716 B2
(45) Date of Patent: Jun. 2, 2015

(54) MICROPOROUS MEMBRANES AND METHODS FOR PRODUCING AND USING SUCH MEMBRANES

(75) Inventors: Kazuhiro Yamada, Nasushiobara (JP); Kotaro Takita, Nasushiobara (JP); Junko Takita, legal representative, Nasushiobara (JP); Shintaro Kikuchi, Nasushiobara (JP)

(73) Assignee: Toray Battery Separator Film Co., LTD., Tochigi (JP)

( * ) Notice: Subject to any disclaimer, the term of this patent is extended or adjusted under 35 U.S.C. 154(b) by 550 days.

(21) Appl. No.: 13/521,968

(22) PCT Filed: Dec. 15, 2010

(86) PCT No.: PCT/JP2010/073055
§ 371 (c)(1),
(2), (4) Date: Jul. 12, 2012

(87) PCT Pub. No.: WO2011/086823
PCT Pub. Date: Jul. 21, 2011

(65) Prior Publication Data
US 2013/0045412 A1    Feb. 21, 2013

Related U.S. Application Data

(60) Provisional application No. 61/294,657, filed on Jan. 13, 2010.

(30) Foreign Application Priority Data

Feb. 12, 2010  (EP) .................................... 10153506

(51) Int. Cl.
*B01D 69/02* (2006.01)
*B01D 69/12* (2006.01)
*B01D 71/26* (2006.01)
*H01M 2/16* (2006.01)
*B01D 67/00* (2006.01)
*H01M 2/14* (2006.01)
*H01M 10/052* (2010.01)

(52) U.S. Cl.
CPC ............ *B01D 71/26* (2013.01); *B01D 67/0027* (2013.01); *B01D 69/02* (2013.01); *B01D 69/12* (2013.01); *H01M 2/145* (2013.01); *H01M 2/1653* (2013.01); *H01M 2/1686* (2013.01); *H01M 10/052* (2013.01); *B01D 2323/08* (2013.01); *B01D 2323/12* (2013.01); *B01D 2325/04* (2013.01); *B01D 2325/22* (2013.01); *B01D 2325/26* (2013.01); *B01D 2325/34* (2013.01)

(58) Field of Classification Search
CPC .... B01D 67/0027; B01D 69/02; B01D 69/12; B01D 71/26; B01D 2323/34; B01D 2323/08; B01D 2323/12; B01D 2325/04; B01D 2325/22; B01D 2325/26; H01M 2/145; H01M 2/1653; H01M 2/1686; H01M 10/052
USPC ........................................... 429/145; 427/58
See application file for complete search history.

(56) References Cited

U.S. PATENT DOCUMENTS

| | | | |
|---|---|---|---|
| 5,691,077 A | 11/1997 | Yu | |
| 6,054,498 A | 4/2000 | Hasegawa et al. | |
| 6,057,060 A | 5/2000 | Yu | |
| 6,132,654 A | 10/2000 | Yu | |
| 6,180,280 B1 | 1/2001 | Spotnitz | |
| 6,346,350 B1 | 2/2002 | Call et al. | |
| 7,985,497 B2 * | 7/2011 | Takita et al. | 429/129 |
| 8,841,032 B2 * | 9/2014 | Ishihara et al. | 429/253 |
| 2007/0264483 A1 | 11/2007 | Ozaki et al. | |
| 2008/0057389 A1 * | 3/2008 | Kono et al. | 429/144 |
| 2009/0098465 A1 | 4/2009 | Kikuchi et al. | |
| 2009/0117454 A1 | 5/2009 | Takita et al. | |
| 2009/0123822 A1 | 5/2009 | Takita et al. | |
| 2009/0186279 A1 | 7/2009 | Brant et al. | |
| 2010/0003591 A1 | 1/2010 | Takita et al. | |
| 2010/0151334 A1 | 6/2010 | Ozaki et al. | |
| 2011/0086276 A1 | 4/2011 | Brant et al. | |

FOREIGN PATENT DOCUMENTS

| | | |
|---|---|---|
| EP | 0 942 480 A1 | 9/1999 |
| EP | 1 047 141 A2 | 10/2000 |
| JP | 10-279718 A | 10/1998 |
| WO | 97/23554 A1 | 7/1997 |
| WO | 2007/132942 A1 | 11/2007 |
| WO | 2008/016174 A1 | 2/2008 |
| WO | 2008/026780 A1 | 3/2008 |
| WO | 2008/140835 A1 | 11/2008 |

OTHER PUBLICATIONS

Sun, Thomas, et al., "Effect of Short Chain Branching on the Coil Dimensions of Polyolefins in Dilute Solution," Macromolecules, 2001, pp. 6812-6820, vol. 34.
International Search Report for PCT/JP2010/073055, dated Apr. 13, 2011.

* cited by examiner

*Primary Examiner* — Nathan M Nutter
(74) *Attorney, Agent, or Firm* — Sughrue Mion, PLLC (57) ABSTRACT

The invention relates to microporous polymeric membranes suitable for use as battery separator film. The invention also relates to a method for producing such a membrane, batteries containing such membranes as battery separators, methods for making such batteries, and methods for using such batteries.

16 Claims, 1 Drawing Sheet

MICROPOROUS MEMBRANES AND METHODS FOR PRODUCING AND USING SUCH MEMBRANES

The application is a 371 Application of PCT/JP2010/073055 filed on Dec. 15, 2010 which claims priority to U.S. Provisional Patent Application No. 61/294,657, filed Jan. 13, 2010, and EP 10153506.0, filed Feb. 12, 2010, the contents of each of which are incorporated by reference in their entirety.

FIELD OF THE INVENTION

The invention relates to multi-layer microporous polymeric membranes suitable for use as battery separator film. The invention also relates to a method for producing such a membrane, batteries containing such membranes as battery separators, methods for making such batteries, and methods for using such batteries.

BACKGROUND OF THE INVENTION

Microporous membranes can be used as battery separator film ("BSF") in, e.g., primary and secondary lithium batteries, lithium polymer batteries, nickel-hydrogen batteries, nickel-cadmium batteries, nickel-zinc batteries, silver-zinc secondary batteries, etc. When microporous polyolefin membranes are used for battery separators, particularly lithium ion battery separators, the membranes' characteristics significantly affect the properties, productivity and performance of the batteries. Accordingly, it is desirable for the microporous membrane to have a relatively high meltdown temperature and be electrochemically stable under conditions of battery manufacturing and use, particularly in batteries subjected to relatively high temperatures as can occur under overcharge or rapid-discharge conditions.

Electrochemically stable microporous membranes having a relatively high meltdown temperature have been produced from polypropylene. For example, Japanese Patent Application JP 10-279718 discloses multi-layer microporous membranes having outer layers comprising polypropylene, the polypropylene content of the outer layers being in the range of 80 wt. % to 100 wt. %. While these membranes have a relatively high meltdown temperature and electrochemical stability, the large amount of polypropylene in the outer layer undesirably lessens the membrane's electrolyte affinity and increases the membrane's moisture retention.

There is therefore a need for microporous membranes having an improved balance of electrochemical stability, high meltdown temperature, high electrolyte affinity, and low moisture retention.

SUMMARY OF THE INVENTION

In an embodiment, the invention relates to membrane comprising (a) a first layer, the first layer comprising 40.0 wt. % to 85.0 wt. % of an isotactic polypropylene based on the weight of the first layer, the isotactic polypropylene having an Mw≥6.0×10$^5$; (b) a second layer comprising polyolefin; and (c) a third layer comprising 40.0 wt. % to 85.0 wt. % of an isotactic polypropylene based on the weight of the third layer, the isotactic polypropylene having an Mw≥6.0×10$^5$; wherein the membrane is microporous; and wherein the second layer is located between the first and third layers.

In another embodiment, the invention relates to a method for producing a microporous membrane, comprising,
(a) forming a first mixture comprising a first diluent and a first polymer, the first polymer comprising 40.0 wt. % to 85.0 wt. % of an isotactic polypropylene based on the weight of the first polymer, the isotactic polypropylene having an Mw≥6.0×10$^5$;
(b) forming a second mixture comprising a second diluent and a second polymer;
(c) forming a third mixture comprising a third diluent and a third polymer, the third polymer comprising 40.0 wt. % to 85.0 wt. % of an isotactic polypropylene based on the weight of the third polymer, the isotactic polypropylene having an Mw≥6.0×10$^5$;
(d) producing a sheet comprising a first layer comprising the first mixture, a third layer comprising the third mixture, and a second layer comprising the second mixture, the second layer being located between the first and third layers; and
(e) removing at least a portion of the first, second, and third diluents from the sheet.

In yet another embodiment, the invention relates to a battery comprising an anode, a cathode, an electrolyte, and at least one separator located between the anode and cathode, the separator comprising first and third layers of substantially equal thickness and a second layer located between the first and third layers, the first and third layers each comprising (i) 40.0 wt. % to 85.0 wt. % of an isotactic polypropylene having an Mw≥5.0×10$^5$, an MWD in the range of from about 2.0 to about 6.0, and a ΔHm≥90.0 J/g, (ii) 15.0 wt. % to 60.0 wt. % of a first polyethylene having an Mw≤1.0×10$^6$, and (iii) ≤45.0 wt. % a second polyethylene having an Mw>1.0×10$^6$, the weight percents being based on the weight of the first or third layer as the case may be; the second layer comprising (i) 55.0 wt. % to 75.0 wt. % of the first polyethylene and (ii) 25.0 wt. % to 45.0 wt. % of the second polyethylene, based on the weight of the second layer.

In yet another embodiment, the invention relates to a membrane, the membrane comprising a first layer comprising isotactic polypropylene, a second layer comprising polyolefin, and a third layer comprising isotactic polypropylene; wherein (i) the membrane is microporous, (ii) the second layer is located between the first and third layers, and (iii) the membrane has an has an electrochemical stability ≤1.0×10$^2$ mAh, a meltdown temperature ≥170.0° C., an electrolytic solution absorption speed ≤3.0×10$^2$ seconds, and an intrinsic absorbed water content ≤10.0 wt. %, based on the weight of the membrane.

The membrane of any preceding embodiment can be used, e.g., as battery separator film in lithium ion batteries.

Optionally, the membrane of any of the preceding embodiments has one or more of a normalized air permeability ≤6.5×10$^2$ seconds/100 cm$^3$/20 μm, a porosity ≥25%, a normalized pin puncture strength ≥2.0×10$^3$ mN/20 μm, an MD tensile strength ≥8.5×10$^4$ kPa, a TD tensile strength ≤8.0×10$^4$ kPa, MD tensile elongation ≥50.0%, a TD tensile elongation ≥50.0%, an electrolytic solution absorption speed ≤2.5×10$^2$ seconds, and an electrochemical stability ≤50.0 mAh.

DETAILED DESCRIPTION OF THE INVENTION

Figure 1:
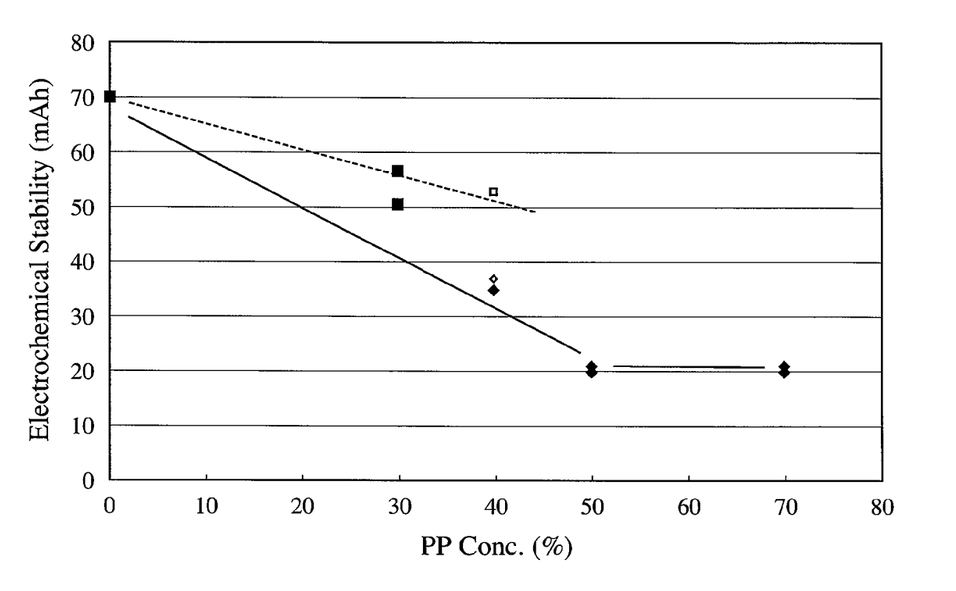
FIG. 1 shows the relationship between membrane electrochemical stability as a function of the relative concentration of polypropylene in the membrane's outer layers. Values for an isotactic polypropylene having a weight average molecular weight ≥6.0×10$^5$ are represented by solid diamonds; values for a polypropylene having a weight average molecular weight <6.0×10$^5$ are represented by solid rectangles.

The invention is based in part on the discovery of multi-layer microporous membranes comprising polymer, e.g., polyolefin such as polyethylene and polypropylene. The membranes have outer layers comprising 40.0 wt. % to 85.0 wt. % isotactic polypropylene, the polypropylene having a weight average molecular weight ("Mw")≥6.0×10$^5$. It has been found that such membranes have suitable electrolyte affinity to be useful as battery separator film (as measured by electrolytic solution absorption speed) without the need for a hydrophilizing post treatment. Hydrophilizing post treatments are undesirable because they increase the amount of moisture absorbed by the membrane. The membranes of the invention have a meltdown temperature and electrochemical stability that are similar to those of conventional microporous membranes having outer layers comprising >85.0 wt. % polypropylene. However, such conventional microporous membranes need a hydrophilizing post treatment to reach the desired level of electrolyte affinity.

For the purpose of this description and the appended claims, the term "polymer" means a composition including a plurality of macromolecules, the macromolecules containing recurring units derived from one or more monomers. The macromolecules can have different size, molecular architecture, atomic content, etc. The term "polymer" includes macromolecules such as copolymer, terpolymer, etc. "Polyethylene" means polyolefin containing ≥50.0% (by number) recurring ethylene-derived units, preferably polyethylene homopolymer and/or polyethylene copolymer wherein at least 85% (by number) of the recurring units are ethylene units. "Polypropylene" means polyolefin containing >50.0% (by number) recurring propylene-derived units, preferably the polypropylene is polypropylene homopolymer and/or polypropylene copolymer wherein at least 85% (by number) of the recurring units are propylene units. The term isotactic polypropylene means polypropylene having a meso pentad fraction ≥about 50.0 mol. % mmmm pentads, preferably ≥96.0 mol. % mmmm pentads. A "microporous membrane" is a thin film having pores, where ≥90.0 percent of the film's pore volume resides in pores having average diameters in the range of from 0.01 μm to 10.0 μm.

Structure and Composition of the Multi-Layer Microporous Membrane

In an embodiment, the microporous membrane comprises first and third layers with a second layer located between the first and third layers. The first and third layers comprise a first layer material, and the second layer comprises a second layer material. The first layer material comprises 40.0 wt. % to 85.0 wt. % polypropylene based on the weight of the first layer material, the polypropylene being an isotactic polypropylene having an Mw≥6.0×10$^5$. The second layer material comprises, e.g., polyolefin. In one embodiment, the membrane's first layer is an outer layer (or "skin" layer), e.g., a planar top layer when the membrane is viewed from above on an axis approximately perpendicular to planar axes along the length and width of the membrane (as manufactured). Optionally, the third layer is an outer layer, e.g., a planar bottom layer that is parallel or approximately parallel to the top layer. Optionally, the microporous membrane is a three-layer membrane, with the second layer (the core layer) in contact with both the first and third layers, e.g., in a stacked arrangement such as A/B/A with face-to-face stacking of the layers. Membranes having more than three layers are also within the scope of the invention, provided such membranes have opposed layers comprising the first layer material and an intermediate layer located between the opposed layers, the intermediate layer comprising the second layer material. For example, the membrane can comprise layers in addition to the two skin layers and the core layer. Optionally, the membrane comprises additional core layers between the first and third layers. The membrane can be a coated membrane, i.e., it can have one or more additional layers on or applied to the first and third layers. Generally, the second layer of the membrane has a thickness ≥50.0% of the membrane's total thickness, e.g., in the range of 70.0% to 90.0% of the membrane's total thickness; and the first and third layers of the membrane have the same thickness, the thickness of the first and third layer each being in the range of 5.0% to 15.0% of the membrane's total thickness. Optionally, the first and third layers have substantially the same thickness and substantially the same composition.

In an embodiment, the first and third layers are produced from (and generally comprise) substantially the same polymer or mixture of polymers (e.g., both are produced from the first layer material). In another embodiment, the third layer comprises a third layer material that is substantially different from the first layer material, the third layer material comprising 40.0 wt. % to 85.0 wt. % of polypropylene based on the weight of the third layer material, the polypropylene being an isotactic polypropylene having an Mw≥6.0×10$^5$. Since the membrane contains polyolefin, it can be called a "polyolefin membrane".

Although the membrane can contain polyolefin only, this is not required, and it is within the scope of the invention for the polyolefin membrane to contain polyolefin and materials that are not polyolefin. Optionally, the polyolefins can be produced, e.g., in a process using a chromium catalyst, a Ziegler-Natta catalyst, or a single-site polymerization catalyst. In one embodiment, the membrane is a three-layer membrane comprising (i) first and third layers comprising a first layer material and (ii) a second layer comprising a second layer material, the second layer being located between the first and third layers. The invention is not limited to this embodiment, and the following description is not meant to foreclose other embodiments within the broader scope of the invention. The first and second layer materials will now be described in more detail.

In an embodiment, (i) the first layer material comprises 40.0 wt. % to 85.0 wt. % polypropylene based on the weight of the first layer material, the polypropylene being an isotactic polypropylene having an Mw≥6.0×10$^5$, and (ii) the second layer material comprises polyolefin. The first layer material can further comprise polyethylene, e.g., 15.0 wt. % to 55.0 wt. % polyethylene. For example, the first layer material can comprise 40.0 wt. % to 85.0 wt. % of the polypropylene, from 15.0 wt. % to 60.0 wt. % of a polyethylene having an Mw≤1.0×10$^6$ (the "first polyethylene"), and ≤45.0 wt. % of polyethylene having an Mw>1.0×10$^6$ (the "second polyethylene"), the weight percents being based on the weight of the first layer material. Optionally, the first layer material comprises 50.0 wt. % to 70.0 wt. % of the polypropylene, e.g., 55.0 wt. % to 65.0 wt. % of the polypropylene.

In an embodiment, the second layer material comprises the first and second polyethylene. For example, the second layer material can comprise ≥50.0 wt. % of the first polyethylene, e.g., in the range of from 55.0 wt. % to 75.0 wt. %, such as 60.0 wt. % to 70.0 wt. %, of the first polyethylene and ≤50.0 wt. % of the second polyethylene, e.g., in the range of from 25.0 wt. % to 45.0 wt. %, such as 30.0 wt. % to 40.0 wt. %, of the second polyethylene, the weight percents being based on the weight of the second layer material. Optionally, the (i) second layer material comprises ≤10.0 wt. % (e.g., 1.0 wt. % to 9.0 wt. %) polypropylene; (ii) the polypropylene of the second layer material is an isotactic polypropylene having an Mw≥6.0×10$^5$ and a ΔHm≥90.0 J/g; and/or (iii) the polypropylene of the second layer material is substantially the same polypropylene as the polypropylene of the first layer material.

In an embodiment, the total amount of polypropylene in the membrane is in the range of 40.0 wt. % to 70.0 wt. %, the total amount of first polyethylene is in the range of 15.0 wt. % to 60.0 wt. %, the total amount of second polyethylene is in the range of 0.0 wt. % to 40.0 wt. %, and the total amount of polyethylene in the membrane is in the range of 80.0 wt. % to 95.0 wt. %, the weight percents being based on the weight of the membrane.

While the first and/or second layer materials can contain copolymers, inorganic species (such as species containing silicon and/or aluminum atoms), and/or heat-resistant polymers such as those described in PCT Publications WO 2007/132942 and WO 2008/016174, these are not required. In an embodiment, the first and second layer materials are substantially free of such materials. Substantially free in this context means the amount of such materials in the layer material is less than 1 wt. % of the total weight of the layer material.

A small amount of diluent or other species, e.g., as processing aids, can also be present in the first and/or second layer materials, generally in amounts less than 1.0 wt. % based on the weight of the layer material. The polypropylene, the first and second polyethylenes, and the diluents used to produce the extrudate and the microporous membrane will now be described in more detail.

Materials Used to Produce the Microporous Membrane

In an embodiment, the membrane is a three-layer membrane, wherein (i) the first and third layers are produced by extruding a mixture of a first diluent and the first layer material and (ii) the second layer is produced by extruding a second diluent and the second layer material. Optionally, inorganic species (such as species containing silicon and/or aluminum atoms), and/or heat-resistant polymers such as those described in PCT Publications WO 2007/132942 and WO 2008/016174 (both of which are incorporated by reference herein in their entirety) can be used to produce the first, second, and/or third layer materials. In an embodiment, these optional species are not used. The final membrane generally comprises the first and second layer materials conducted to the extruder. A small amount of polymer molecular weight degradation can occur during processing, but this is acceptable. Likewise, a small amount of first and/or second diluent can remain in the finished membrane. Generally, these small amounts are ≤1.0 wt. % based on the weight of the final membrane.

A. The First Polyethylene

The first polyethylene has an Mw≤$1.0×10^6$, e.g., in the range of from about $1.0×10^5$ to about $9.0×10^5$, for example from about $4.0×10^5$ to about $8.0×10^5$. Optionally, the first polyethylene has a molecular weight distribution ("MWD") in the range of from about 1.5 to about 50.0, for example from about 3.0 to about 20.0. For example, the first polyethylene can be one or more of a high density polyethylene ("HDPE"), a medium density polyethylene, a branched low density polyethylene, or a linear low density polyethylene.

In an embodiment, the first polyethylene has an amount of terminal unsaturation ≥0.2 per $1.0×10^5$ carbon atoms, e.g., ≥5.0 per $1.0×10^5$ carbon atoms or ≥10.0 per $1.0×10^5$ carbon atoms. The amount of terminal unsaturation can be measured in accordance with the procedures described in PCT Publication WO 97/23554, for example.

In an embodiment, the first polyethylene is at least one of (i) an ethylene homopolymer or (ii) a copolymer of ethylene and ≤5.0 mol. % of a comonomer such as one or more of propylene, butene-1, pentene-1, hexene-1,4-methylpentene-1, octene-1, vinyl acetate, methyl methacrylate, or styrene. Optionally, the first polyethylene has a melting point ≥132.0° C. The first polyethylene can be, e.g., Lupolen™, available from Basell and/or SUNFINE SH-800™ polyethylene, available from Asahi Kasei.

B. The Second Polyethylene

The second polyethylene has an Mw>$1.0×10^6$, e.g., in the range of $1.1×10^6$ to about $5.0×10^6$, for example from about $1.2×10^6$ to about $3.0×10^6$, such as about $2.0×10^6$. Optionally, the second polyethylene has an MWD≤50.0, e.g., from about 2.0 to about 25.0, such as from about 4.0 to about 20.0 or about 4.5 to 10. For example, the second polyethylene can be an ultra-high molecular weight polyethylene ("UHMWPE"). In an embodiment, the second polyethylene is at least one of (i) an ethylene homopolymer or (ii) a copolymer of ethylene and ≤5.0 mol. % of a comonomer such as one or more of propylene, butene-1, pentene-1, hexene-1,4-methylpentene-1, octene-1, vinyl acetate, methyl methacrylate, or styrene. Optionally, the second polyethylene has a melting point ≥134.0° C. Such a polymer or copolymer can be produced using a single-site catalyst. The second polyethylene can be, e.g., Hi-ZEX 240M™ polyethylene, available from Mitsui.

The Tm of the first and second polyethylenes can be determined using the methods disclosed in PCT Patent Publication No. WO 2008/140835, for example.

C. Polyethylene Mw and MWD

Mw and MWD (defined as the ratio of Mw to number average molecular weight, "Mn") of the first and second polyethylenes are determined using a High Temperature Size Exclusion Chromatograph, or "SEC", (GPC PL 220, Polymer Laboratories), equipped with a differential refractive index detector (DRI). Three PLgel Mixed-B columns (available from Polymer Laboratories) are used. The nominal flow rate is 0.5 cm³/min, and the nominal injection volume is 300 μL. Transfer lines, columns, and the DRI detector are contained in an oven maintained at 145° C. The measurement is made in accordance with the procedure disclosed in Macromolecules, Vol. 34, No. 19, pp. 6812-6820 (2001).

The GPC solvent is filtered Aldrich reagent grade 1,2,4-Trichlorobenzene (TCB) containing approximately 1000 ppm of butylated hydroxy toluene (BHT). The TCB is degassed with an online degasser prior to introduction into the SEC. Polymer solutions are prepared by placing dry polymer in a glass container, adding the desired amount of above TCB solvent, then heating the mixture at 160° C. with continuous agitation for about 2 hours. The concentration of polymer solution is 0.25 to 0.75 mg/ml. Sample solution is filtered off-line before injecting to GPC with 2 μm filter using a model SP260 Sample Prep Station (available from Polymer Laboratories).

The separation efficiency of the column set is calibrated with a calibration curve generated using a seventeen individual polystyrene standards ranging in Mp from about 580 to about 10,000,000, which is used to generate the calibration curve. The polystyrene standards are obtained from Polymer Laboratories (Amherst, Mass.). A calibration curve (log Mp vs. retention volume) is generated by recording the retention volume at the peak in the DRI signal for each PS standard, and fitting this data set to a 2nd-order polynomial. Samples are analyzed using IGOR Pro, available from Wave Metrics, Inc.

D. The Polypropylene

In an embodiment, the polypropylene is isotactic and has an Mw≥$6.0×10^5$, such as. ≥$7.5×10^5$, for example in the range of from about $0.9×10^6$ to about $2.0×10^6$. Optionally, the polypropylene has a melting point ("Tm")≥160.0° C. and a ΔHm≥90.0 J/g, e.g., ≥100.0 J/g, such as in the range of from 110 J/g to 120 J/g. Optionally, the polypropylene has an MW≤20.0, such as ≤6.0, e.g., in the range of from about 1.5 to about 10.0, such as in the range of from about 2.0 to about 6.0. Optionally, the isotactic polypropylene is a copolymer (random or block) of propylene and ≤5.0 mol. % of a comonomer, the comonomer being, e.g., one or more of α-olefins such as ethylene, butene-1, pentene-1, hexene-1,4-methylpentene-1, octene-1, vinyl acetate, methyl methacrylate, and styrene, etc.; or diolefins such as butadiene, 1,5-hexadiene, 1,7-octadiene, 1,9-decadiene, etc.

In an embodiment, the isotactic polypropylene has (a) a meso pentad fraction ≥about 90.0 mol. % mmmm pentads, preferably ≥96.0 mol. % mmmm pentads; and (b) has an amount of stereo defects ≤about 50.0 per $1.0 \times 10^4$ carbon atoms, e.g., ≤about 20 per $1.0 \times 10^4$ carbon atoms, or ≤about 10.0 per $1.0 \times 10^4$ carbon atoms, such as ≤about 5.0 per $1.0 \times 10^4$ carbon atoms. Optionally, the isotactic polypropylene has one or more of the following properties: (i) a Tm.≥162.0° C.; (ii) an elongational viscosity ≥about $5.0 \times 10^4$ Pa sec at a temperature of 230° C. and a strain rate of 25 $\sec^{-1}$, (iii) a Trouton's ratio ≥about 15 when measured at a temperature of about 230° C. and a strain rate of 25 $\sec^{-1}$, (iv) a Melt Flow Rate ("MFR"; ASTM D-1238-95 Condition L at 230° C. and 2.16 kg) ≤about 0.01 dg/min (i.e., a value is low enough that the MFR is essentially not measurable); or (v) an amount extractable species (extractable by contacting the polypropylene with boiling xylene) ≤0.5 wt. %, e.g., ≤0.2 wt. %, such as ≤0.1 wt. % or less based on the weight of the polypropylene.

In an embodiment, the isotactic polypropylene has an Mw in the range of from about $0.9 \times 10^6$ to about $2.0 \times 10^6$, an MWD in the range of from about 2.0 to about 6.0, and a ΔHm≥90.0 J/g. Generally, such a polypropylene has a meso pentad fraction ≤96.0 mol. % mmmm pentads, an amount of stereo defects ≤about 5.0 per $1.0 \times 10^4$ carbon atoms, and a Tm≥162.0° C.

A non-limiting example of the polypropylene, and methods for determining the polypropylene's Tm, Mw, MWD, meso pentad fraction, tacticity, intrinsic viscosity, Trouton's ratio, stereo defects, and amount of extractable species are described in PCT Patent Publication No. WO 2008/140835, which is incorporated by reference herein in its entirety.

The polypropylene's ΔHm, is determined using differential scanning calorimetry (DSC). The DSC is conducted using a TA Instrument MDSC 2920 or Q1000 Tzero-DSC and data analyzed using standard analysis software. Typically, 3 to 10 mg of polymer is encapsulated in an aluminum pan and loaded into the instrument at room temperature. The sample is cooled to a temperature ≤−70° C. and heated to 210° C. at a heating rate of 10° C./minute to evaluate the glass transition and melting behavior for the sample. The sample is held at 210° C. for 5 minutes to destroy its thermal history. Crystallization behavior is evaluated by cooling the sample from the melt to 23.0° C. temperature at a cooling rate of 10° C./minute. The sample is held at 23.0° C. for 10 minutes to equilibrate in the solid state and achieve a steady state. Second heating data is measured by heating this melt crystallized sample at 10° C./minute. Second heating data thus provides phase behavior for samples crystallized under controlled thermal history conditions. The endothermic melting transition (first and second melt) and exothermic crystallization transition are analyzed for onset of transition and peak temperature. The area under the curve is used to determine the heat of fusion (ΔHm).

Methods of Producing the Microporous Membrane

In an embodiment, the multi-layer microporous membrane of the invention comprises three layers, e.g., the membrane is a three-layer membrane. One method for producing such a membrane comprises layering, such as for example by lamination or coextrusion of extrudates or membranes, e.g., monolayer extrudates or monolayer microporous membranes. For example, skin layers comprising a first diluent and the first layer material can be coextruded with at least one core layer comprising a second diluent (which can be substantially the same as the first diluent) and the second layer material. The process can further comprise orienting the coextruded extrudate (e.g., by stretching) and removing at least a portion of the first, second, and third diluents to produce the multilayer membrane.

Another method for producing the membrane involves laminating, e.g., using heat and pressure, first and third microporous monolayer membranes on opposed faces of a second microporous monolayer membrane. The first and third microporous membranes comprise the first layer material and the second microporous membrane comprising the second layer material. The first, second, and third microporous membranes can be produced by (i) a wet process, (ii) by a dry process, e.g., a process in which a membrane is produces using little or no diluent, or (iii) by a combination of wet and dry processes, e.g., where the first and third microporous membranes are produced in a dry process and the second microporous membrane is produced in a wet process. While the following description is mainly directed towards three-layer membranes produced using a wet process, the invention is not limited thereto, and this description is not meant to foreclose other embodiments within the broader scope of the invention.

Accordingly, in one embodiment the membrane is produced by a continuous or semi-continuous (e.g., sequential batch) process comprising cooling a multilayer extrudate having a first planar direction (e.g., the direction of extrusion, also called the "machine direction" or "MD") and a second planar direction orthogonal to both MD and the thickness of the membrane (e.g., the direction transverse to MD, called the transverse direction or "TD"). The extrudate comprises first, second, and third layers, wherein the second layer is located between the first and third layers. The first and third layers of the extrudate comprise the first layer material and a first diluent, and the second layer of the extrudate comprises the second layer material and a second diluent. The first and third layers can be outer layers of the extrudate, also called skin layers. Those skilled in the art will appreciate that (i) the third layer of the extrudate could be produced from a third layer material, the third layer material being compositionally distinct from the first layer material but selected from substantially the same polymer or mixture of polymers as the first layer material and/or (ii) the third layer can have a thickness that is substantially the same as or different than that of the first layer. In one embodiment, the process further comprises stretching the cooled extrudate in MD and/or TD and removing at least a portion of the first and second diluents from the stretched extrudate to produce a dried membrane having a first dry length (in MD) and a first dry width (in TD). Optionally, the process further comprises stretching the dried membrane along MD and optionally TD to form the final membrane. An embodiment for producing a three-layer microporous membrane will now be described in more detail. While the invention is described in terms of a three-layer membrane produced from an extruded sheet according to the wet process, the invention is not limited thereto, and the description is not meant to foreclose other embodiments within the broader scope of the invention.

Combining the First Layer Material and First Diluent

The first layer material is produced from a polymer blend, obtained by combining the polypropylene, the first polyethylene and optionally the second polyethylene, e.g., by dry mixing or melt blending. The polymers can be in the form of polymer resins having the morphology conventionally used for producing microporous film. The combined polymers are mixed with the first diluent (which can be a diluent mixture, e.g., a solvent mixture) to form a first mixture. The first mixture can optionally contain additives such as one or more antioxidant. In an embodiment, the amount of such additives does not exceed 1.0 wt. % based on the weight of the mixture of polymer and diluent.

Any species (or mixture of species) capable of forming a single phase in conjunction with the resin at the extrusion temperature may be used as a diluent. For example, the first diluent can be a solvent for the polymers of the first layer material. Representative diluent examples include aliphatic or cyclic hydrocarbon such as nonane, decane, decalin and paraffin oil, and phthalic acid ester such as dibutyl phthalate and dioctyl phthalate. Paraffin oil with kinetic viscosity of 20-200 cSt at 40° C. can be used. The choice of first diluent, mixing condition, extrusion condition, etc. can be the same as those disclosed in PCT Publication No. WO 2008/016174, for example, which is incorporated by reference herein in its entirety.

The amount of first diluent in the combined diluent and first layer material in the first polyolefin solution is not critical. In an embodiment, the amount of first diluent is in the range of 15.0 wt. % to 99.0 wt. %, e.g., 18.0 wt. % to 95.0 wt. %, or 20.0 wt. % to 90.0 wt. %, based on the combined weight of first diluent and first layer material.

Combining the Second Layer Material and Second Diluent

The second layer material can also be a polymer blend. The second layer material and the second diluent can be combined to form a second mixture by the same methods used to combine the first layer material and first diluent. For example, the polymer comprising the second layer material can be combined by melt-blending the first polyethylene, the second polyethylene, and optionally the polypropylene. The second diluent can be selected from among the same diluents as the first diluent. Although the type and concentration of second diluent in the second mixture can be (and generally are) selected independently of those of the first diluent, the second diluent can be the same as the first diluent, and can be used in the same relative concentration in the second mixture as the first diluent is used in the first mixture.

Extrusion

In an embodiment, the combined first layer material and first diluent is conducted from a first extruder to first and third dies and the combined second layer material and second diluent is conducted from a second extruder to a second die. A layered extrudate in sheet form (i.e., a body significantly larger in the planar directions than in the thickness direction) can be extruded (e.g., coextruded) from the first, second, and third dies to produce a multi-layer extrudate having skin layers comprising the first mixture and a core layer comprising the second mixture.

The choice of die or dies and extrusion conditions can be the same as those disclosed in PCT Publication No. WO 2008/016174, for example.

Cooling the Multilayer Extrudate (Optional)

Optionally, the multilayer extrudate conducted away from extrusion is exposed to a temperature in the range of 15° C. to 25° C. to form a cooled extrudate. Optionally, the extrudate can be cooled at a cooling rate of at least about 30° C./minute until the temperature of the extrudate (the cooled temperature) is approximately equal to the extrudate's gelation temperature (or lower). Process conditions for cooling can be the same as those disclosed in PCT Publication No. WO 2008/01617, for example. In an embodiment, the cooled extrudate has a thickness ≤10 mm, e.g., in the range of 0.1 mm to 10 mm, or 0.5 mm to 5 mm. Generally, the second layer of the cooled extrudate has a thickness of 74.0% to 88.0% of the cooled extrudate's total thickness; and the first and third layers of the cooled extrudate have substantially the same thickness, the thickness of the first and third layer each being in the range of 6.0% to 13.0% of the cooled extrudate's total thickness.

Stretching the Cooled Extrudate (Optional)

The cooled extrudate can be stretched (referred to as "wet" stretching) in at least one direction (e.g., at least one planar direction, such as MD or TD) to produce a stretched extrudate. Optionally, the extrudate is stretched simultaneously in the MD and TD to a magnification factor in the range of 4.0 to 6.0. Suitable stretching methods are described in PCT Publication No. WO 2008/016174, for example. The stretching magnification can be, for example, 2 fold or more, preferably 3 to 30 fold in the case of monoaxial stretching. In the case of biaxial stretching, the stretching magnification factor can be, for example, 3 fold or more in any direction, namely 9 fold or more, such as 16 fold or more, e.g. 25 fold or more, in area magnification. An example for this stretching step would include stretching from about 9 fold to about 49 fold in area magnification. Again, the amount of stretch in either direction need not be the same. The magnification factor operates multiplicatively on film size. For example, a film having an initial width (TD) of 2.0 cm that is stretched in TD to a magnification factor of 4 fold will have a final width of 8.0 cm.

Optionally, the MD and TD magnifications are the same. In an embodiment, the stretching magnification is substantially equal to 5 in MD and TD. Optionally, the stretching can be conducted while exposing the extrudate to a temperature in the range of from about the Tcd to Tm. Tcd and Tm are defined as the crystal dispersion temperature and melting point of the polyethylene having the lowest melting point among the polyethylenes used to produce the extrudate (i.e., the first and second polyethylene). The crystal dispersion temperature is determined by measuring the temperature characteristics of dynamic viscoelasticity according to ASTM D 4065. In an embodiment, the stretching temperature is in the range of from about 110° C. to 120° C.; e.g., from about 112.0° C. to 119.0° C.

In an embodiment, the stretched extrudate undergoes an optional thermal treatment before diluent removal. In the thermal treatment, the stretched extrudate is exposed to a temperature that is cooler (lower) than the temperature to which the extrudate is exposed during stretching. The planar dimensions of the stretched extrudate (length in MD and width in TD) can be held constant while the stretched extrudate is exposed to the lower temperature. Since the extrudate contains polymer and diluent, its length and width are referred to as the "wet" length and "wet" width. In an embodiment, the stretched extrudate is exposed to a temperature in the range of 90.0° C. to 100.0° C. for a time in the range of 1 second to 100 seconds while the wet length and wet width are held constant, e.g., by using tenter clips to hold the stretched extrudate along its perimeter. In other words, during the thermal treatment, there is no magnification or demagnification (i.e., no dimensional change) of the stretched extrudate in MD or TD.

In this step and in other steps such as dry orientation and heat setting where the sample (e.g., the extrudate, dried extrudate, membrane, etc.) is exposed to an elevated temperature, this exposure can be accomplished by heating air and then conveying the heated air into proximity with the sample. The temperature of the heated air, which is generally controlled at a set point equal to the desired temperature, is then conducted toward the sample through a plenum for example. Other methods for exposing the sample to an elevated temperature, including conventional methods such as exposing the sample to a heated surface, infra-red heating in an oven, etc. can be used with or instead heated air.

Diluent Removal

In an embodiment, at least a portion of the first and second diluents (e.g., membrane-forming solvents) are removed (or displaced) from the stretched extrudate to form a dried membrane. A displacing (or "washing") solvent can be used to remove (wash away, or displace) the first and second diluents. Process conditions for removing first and second diluents can be the same as those disclosed in PCT Publication No. WO 2008/016174, for example. The term "dried membrane" refers to an extrudate from which at least a portion of the diluent has been removed. It is not necessary to remove all diluent from the stretched extrudate, although it can be desirable to do so since removing diluent increases the porosity of the final membrane.

In an embodiment, at least a portion of any remaining volatile species, such as washing solvent, can be removed from the dried membrane at any time after diluent removal.

Any method capable of removing the washing solvent can be used, including conventional methods such as heat-drying, wind-drying (moving air), etc. Process conditions for removing volatile species such as washing solvent can be the same as those disclosed in PCT Publications No. WO 2008/016174 and WO 2007/132942, for example.

Stretching the Dried Membrane (Optional)

The dried membrane can be stretched (called "dry stretching") in at least MD. Before dry stretching, the dried membrane has an initial size in MD (a first dry length) and an initial size in TD (a first dry width). As used herein, the term "first dry width" refers to the size of the dried membrane in the transverse direction prior to the start of dry orientation. The term "first dry length" refers to the size of the dried membrane in the machine direction prior to the start of dry orientation. Tenter stretching equipment of the kind described in WO 2008/016174 can be used, for example.

The dried membrane can be stretched in MD from the first dry length to a second dry length that is larger than the first dry length by a magnification factor (the "MD dry stretching magnification factor") in the range of from about 1.1 to about 1.5, e.g., about 1.2. When TD dry stretching is used, the dried membrane can be stretched in TD from the first dry width to a second dry width that is larger than the first dry width by a magnification factor (the "TD dry stretching magnification factor"). Optionally, the TD dry stretching magnification factor is ≤the MD dry stretching magnification factor. The TD dry stretching magnification factor can be in the range of from about 1.1 to about 1.3. The stretching (also called re-stretching since the diluent-containing extrudate has already been stretched) can be sequential or simultaneous in MD and TD. Since TD heat shrinkage generally has a greater effect on battery properties than does MD heat shrinkage, the amount of TD dry magnification generally does not exceed the amount of MD dry magnification. When TD dry stretching is used, the dry stretching can be simultaneous in MD and TD or sequential. When the dry stretching is sequential, generally MD stretching is conducted first followed by TD stretching. The dry stretching is generally conducted while exposing the dried membrane to a temperature ≤Tm, such as in the range of from about Tcd −30° C. to Tm, e.g., in the range of from about 118° C. to about 133° C., such as from about 119° C. to about 128° C.

The stretching rate is preferably 3%/second or more in the stretching direction (MD or TD). Optionally, the MD stretching rate is the same as the TD stretching rate. The stretching rate is preferably 5%/second or more, more preferably 10%/second or more, e.g., in the range of 5%/second to 25%/second. Though not critical, the upper limit of the stretching rate is preferably 50%/second to prevent rupture of the membrane.

Controlled Reduction of the Membrane's Width (Optional)

Following the dry stretching, the dried membrane can be subjected to a controlled reduction in width from the second dry width to a third width, the third dry width being in the range of from the first dry width to about 1.1 times larger than the first dry width. The width reduction is generally conducted while the membrane is exposed to a temperature ≥Tcd −30° C., but less than Tm, e.g., in the range of from about 118° C. to about 133° C., such as from about 119° C. to about 128° C. In an embodiment; the decreasing of the membrane's width is conducted while the membrane is exposed to a temperature that is lower than Tm. In an embodiment, the third dry width is in the range of from 1.0 times larger than the first dry width to about 1.1 times larger than the first dry width.

It is believed that exposing the membrane to a temperature during the controlled width reduction that is ≥the temperature to which the membrane was exposed during the TD stretching leads to greater resistance to heat shrinkage in the finished membrane.

Heat-Setting (Optional)

Optionally, the membrane is thermally treated (e.g., heat-set) one or more times after diluent removal, e.g., after dry stretching, the controlled width reduction, or both. It is believed that heat-setting stabilizes crystals and make uniform lamellas in the membrane. In an embodiment, the heat setting is conducted while exposing the membrane to a temperature in the range Tcd to Tm, e.g., in the range of from about 118° C. to about 133° C., such as from about 119° C. to about 128° C. Generally, the heat setting is conducted for a time sufficient to form uniform lamellas in the membrane, e.g., a time in the range of 1 to 100 seconds. In an embodiment, the heat setting is operated under conventional heat-set "thermal fixation" conditions. The term "thermal fixation" refers to heat setting carried out while maintaining the length and width of the membrane substantially constant, e.g., by holding the membrane's perimeter using tenter clips during the heat setting.

Optionally, an annealing treatment can be conducted before, during, or after the heat-setting. The annealing is a heat treatment with no load applied to the membrane, and can be conducted by using, e.g., a heating chamber with a belt conveyer or an air-floating-type heating chamber. The annealing can be conducted continuously, e.g., after the heat-setting with the tenter slackened. The annealing can be conducted continuously, e.g., after the heat-setting with the tenter slackened. The temperature to which the membrane is exposed during annealing, (the "annealing temperature") can be, e.g., in the range of from about 118° C. to about 133° C., such as from about 119° C. to about 128° C. Annealing is believed to provide the microporous membrane with improved heat shrinkage and strength.

Optional heated roller, hot solvent, cross linking, hydrophilizing, and coating treatments can be conducted if desired, e.g., as described in PCT Publication No. WO 2008/016174.

Properties of the Multi-Layer Microporous Membrane

In an embodiment, the membrane is a multi-layer microporous membrane. For example, in one embodiment, the membrane comprises (a) a first layer comprising isotactic polypropylene, (b) a second layer comprising polyolefin, and (c) a third layer comprising isotactic polypropylene; wherein (i) the membrane is microporous, (ii) the second layer is located between the first and third layers, and (iii) the membrane has an. electrochemical stability ≤$1.0 \times 10^2$ mAh, a meltdown temperature ≥170.0° C., an electrolytic solution absorption speed ≤3.0×10² seconds, and an absorbed water content ≤10.0 wt. %, based on the weight of the membrane.

In another embodiment, the membrane has first and third layers, with each of the first and third layers comprising (i) 40.0 wt. % to 85.0 wt. % of an isotactic polypropylene having an Mw≥6.0×10⁵, an MWD in the range of from about 2.0 to about 6.0, and a ΔHm≥90.0 J/g, (ii) 15.0 wt. % to 60.0 wt. % of a first polyethylene having an Mw≤1.0×10⁶, and (iii) ≤45.0 wt. % a second polyethylene having an Mw>1.0×10⁶ based on the weight of the layer. The membrane further comprises a second layer located between the first and third layers, with the second layer comprising (i) 55.0 wt. % to 75.0 wt. % of the first polyethylene and (ii) 25.0 wt. % to 45.0 wt. % of the second polyethylene, based on the weight of the second layer. The first and third layers can have substantially equal thickness, for example.

In yet another embodiment, the membrane has first and third layers, with each of the first and third layers comprising ≥50.0 wt. %, e.g., 65.0 wt. % to 75.0 wt. %, of an isotactic polypropylene. The membrane further comprises a second layer located between the first and third layers, with the second layer comprising ≤10.0 wt. % of the isotactic polypropylene, and wherein the membranes heat shrinkage ≤2.5%, e.g., ≤1.0%, in at least one planar direction, such as a TD heat shrinkage at 120° C.≤1.0%.

The membrane's thickness is generally ≥3.0 µm. For example, the membrane can have a thickness in the range of from about 5.0 µm to about 2.0×10² µm, e.g., from about 10.0 µm to about 25.0 µm. Optionally, the second layer has a thickness of 70.0% to 90.0% of the membrane's total thickness; and the thicknesses of the first and third layers are each in the range of 5.0% to 15.0% of the membrane's total thickness. The membrane's thickness can be measured, e.g., by a contact thickness meter at 1.0 cm longitudinal intervals over the width of 10.0 cm, and then averaged to yield the membrane thickness. Thickness meters such as the Litematic available from Mitsutoyo Corporation are suitable. Non-contact thickness measurement methods are also suitable, e.g. optical thickness measurement methods.

Optionally, the membrane has one or more of the following properties.

Porosity

In an embodiment, the membrane has a porosity ≥25%, e.g., in the range of about 25% to about 80%, or 35% to 60%. The membrane's porosity is measured conventionally by comparing the membrane's actual weight to the weight of an equivalent non-porous membrane of the same composition (equivalent in the sense of having the same length, width, and thickness). Porosity is then determined using the formula: Porosity %=100×(w2−w1)/w2, wherein "w1" is the actual weight of the microporous membrane and "w2" is the weight of an equivalent non-porous membrane having the same size and thickness.

Normalized Air Permeability

In an embodiment, the membrane's normalized air permeability (Gurley value, normalized to an equivalent membrane thickness of 20.0 µm) is ≤7.0×10² seconds/100 cm³/20 µm, e.g., ≤6.0×10² seconds/100 cm³/20 µm. Since the air permeability value is normalized to a film thickness of 20.0 µm, the air permeability value is expressed in units of "seconds/100 cm³/20 µm". In an embodiment, the normalized air permeability is in the range of 1.0×10² seconds/100 cm³/20 µm to about 6.5×10² seconds/100 cm³/20 µm, or 1.5×10² seconds/100 cm³/20 µm to 4.5×10² seconds/100 cm³/20 µm. Normalized air permeability is measured according to JIS P8117, and the results are normalized to a value at a thickness of 20.0 µm using the equation $A = 20.0\ \mu m \ast (X)/T_1$, where X is the measured air permeability of a membrane having an actual thickness $T_1$ and A is the normalized air permeability at a thickness of 20.0 µm.

Normalized Pin Puncture Strength

In an embodiment, the membrane has a pin puncture strength ≥2.0×10³ mN/20 µm, e.g., ≥3.0×10³ mN/20 µm or ≥4.0×10³ mN/20 µm, such as in the range of 3.0×10³ mN/20 µm to 1.0×10⁴ mN/20 µm. Pin puncture strength is defined as the maximum load measured when a microporous membrane having a thickness of T1 is pricked with a needle of 1.0 mm in diameter with a spherical end surface (radius R of curvature: 0.5 mm) at a speed of 2.0 mm/second. The pin puncture strength is normalized to a value at a membrane thickness of 20.0 µm using the equation $S_2 = 20.0\ \mu m \ast (S_1)/T_1$, where $S_1$ is the measured pin puncture strength, $S_2$ is the normalized pin puncture strength, and $T_1$ is the average thickness of the membrane.

Tensile Strength

In an embodiment, the membrane has an MD tensile strength ≥8.5×10⁴ kPa, e.g., in the range of 1.0×10⁵ kPa to 2.0×10⁵ kPa, and a TD tensile strength ≥8.0×10⁴ kPa, e.g., in the range of 1.0×10⁵ kPa to 2.0×10⁵ kPa. Tensile strength is measured in MD and TD according to ASTM D-882A.

Tensile Elongation ≥50.0%

Tensile elongation is measured according to ASTM D-882A. In an embodiment, the membrane's MD and TD tensile elongation are each ≥150%, e.g., in the range of 150% to 350%. In another embodiment, the membrane's MD tensile elongation is in the range of, e.g., 150% to 250% and TD tensile elongation is in the range of, e.g., 150% to 250%.

Shutdown Temperature

In an embodiment, the membrane has a shutdown temperature ≤140° C., e.g., in the range of about 128° C. to about 135° C. The shutdown temperature of the microporous membrane is measured by a thermomechanical analyzer (TMA/SS6000 available from Seiko Instruments, Inc.) as follows: A rectangular sample of 3.0 mm×50.0 mm is cut out of the microporous membrane such that the long axis of the sample is aligned with membrane's TD and the short axis is aligned with MD. The sample is set in the thermomechanical analyzer at a chuck distance of 10 mm, i.e., the distance from the upper chuck to the lower chuck is 10.0 mm. The lower chuck is fixed and a load of 19.6 mN applied to the sample at the upper chuck. The chucks and sample are enclosed in a tube which can be heated. Starting at 30.0° C., the temperature inside the tube is elevated at a rate of 5.0° C./minute, and sample length change under the 19.6 mN load is measured at intervals of 0.5 second and recorded as temperature is increased. The temperature is increased to 200.0° C. "Shutdown temperature" is defined as the temperature of the inflection point observed at approximately the melting point of the polymer having the lowest melting point among the polymers used to produce the membrane.

Meltdown Temperature

In an embodiment, the membrane's meltdown temperature is ≥170.0° C. or ≥180.0° C., e.g., in the range of 171.0° C. to 200.0° C., or 172.0° C. to 190.0° C. The membrane meltdown temperature is measured by the following procedure: A rectangular sample of 3.0 mm×50.0 mm is cut out of the microporous membrane such that the long axis of the sample is aligned with the microporous membrane's TD as it is produced in the process and the short axis is aligned with MD. The sample is set in the thermomechanical analyzer (TMA/SS6000 available from Seiko Instruments, Inc.) at a chuck distance of 10.0 mm, i.e., the distance from the upper chuck to the lower chuck is 10.0 mm. The lower chuck is fixed and a load of 19.6 mN applied to the sample at the upper chuck. The chucks and sample are enclosed in a tube which can be heated. Starting at 30.0° C., the temperature inside the tube is elevated at a rate of 5° C./minute, and sample length change under the 19.6 mN load is measured at intervals of 0.5 second and recorded as temperature is increased. The temperature is increased to 200.0° C. The meltdown temperature of the sample is defined as the temperature at which the sample breaks, generally at a temperature ≥170.0° C.

Heat Shrinkage at 105° C. in at Least One Planar Direction ≤15% or Less

In an embodiment, the membrane has a heat shrinkage at 105° C. in at least one planar direction (e.g., MD or TD) of ≤15% e.g., ≤10.0%, such as in the range of from 1.0% to 10.0%. The membrane's shrinkage at 105° C. in MD and TD is measured as follows: (i) measure the size of a test piece of microporous membrane at ambient temperature in both the MD and TD, (ii) equilibrate the test piece of the microporous membrane at a temperature of 105.0° C. for 8 hours with no applied load, and then (iii) measure the size of the membrane in both the MD and TD. The heat (or "thermal") shrinkage in MD and TD can be obtained by dividing the result of measurement (i) by the result of measurement (ii), and expressing the quotient as a percent.

TD Heat Shrinkage at 120° C.

In an embodiment, the membrane has a TD heat shrinkage measured at 120° C.≤15%, e.g., 1.0% to 12.0%. A relatively low heat shrink value, e.g., 15% can be of particular significance since 120° C. is generally within the operating temperature range of a lithium ion secondary battery during charging and discharging, albeit near the upper (shut-down) end of this range.

The measurement is slightly different from the measurement of heat shrinkage at 105° C., reflecting the fact that the edges of the membrane parallel to the membrane's TD are generally fixed within the battery, with a limited degree of freedom allowed for expansion or contraction (shrinkage) in TD, particularly near the center of the edges parallel to the membrane's MD. Accordingly, a square sample of microporous film measuring 50.0 mm along TD and 50.0 mm along MD is mounted in a frame, with the edges parallel to TD fixed to the frame (e.g., by tape) leaving a clear aperture of 35.0 mm in MD and 50.0 mm in TD. The frame with sample attached is then heated in thermal equilibrium (e.g., in an oven) at a temperature of 120.0° C. for thirty minutes, and then cooled. TD heat shrinkage generally causes the edges of the film parallel to MD to bow slightly inward (toward the center of the frame's aperture). The shrinkage in TD (expressed as a percent) is equal to the length of the sample in TD before heating divided by the narrowest length (within the frame) of the sample in TD after heating times 100%.

Maximum Heat Shrinkage in Molten State

Maximum shrinkage in the molten state in a planar direction of the membrane is measured by the following procedure.

Using the TMA procedure described for the measurement of meltdown temperature, the sample length measured in the temperature range of from 135° C. to 145° C. are recorded. The membrane shrinks, and the distance between the chucks decreases as the membrane shrinks. The maximum shrinkage in the molten state is defined as the sample length between the chucks measured at 23° C. (L1 equal to 10.0 mm) minus the minimum length measured generally in the range of about 135° C. to about 145° C. (equal to L2) divided by L1, i.e., [L1−L2]/L1*100%. When TD maximum shrinkage is measured, the rectangular sample of 3.0 mm×50.0 mm used is cut out of the microporous membrane such that the long axis of the sample is aligned with the transverse direction of the microporous membrane as it is produced in the process and the short axis is aligned with the machine direction. When MD maximum shrinkage is measured, the rectangular sample of 3.0 mm×50.0 mm used is cut out of the microporous membrane such that the long axis of the sample is aligned with MD of the microporous membrane as it is produced in the process and the short axis is aligned with TD.

In an embodiment, the membrane's maximum MD heat shrinkage in the molten state is ≤30.0% or ≤25.0%, or ≤15.0%, e.g., in the range of 1.0% to 25.0%, or 2.0% to 20.0%. In an embodiment, the membrane's maximum TD heat shrinkage in the molten state is ≤35.0%, or ≤30.0%, or ≤15.0%, e.g., in the range of 1.0% to 35.0%.

Electrolytic Solution Absorption Speed

In an embodiment, the membrane has an electrolytic solution absorption speed ≤3.0×10$^2$ seconds, such as ≤2.5×10$^2$ seconds, e.g., in the range of 1.0×10$^2$ seconds to 3.0×10$^2$ seconds. A membrane's electrolytic solution absorption speed is measured using a 100 mm×100 mm membrane sample placed on a clear glass support and exposed to a temperature of 25° C. A single drop of propylene carbonate of approximately 1.0 mm in diameter is placed on the membrane at an initial time, and the membrane is illuminated with incandescent visible light. The absorption of the propylene carbonate leads to an increase in membrane transparency to the light. The elapsed time in seconds between the initial time and the time at which the portion of the membrane in contact with the drop exhibits no significant increase in transparency (measured in seconds) is the membrane's electrolytic solution absorption speed. Battery separator film having a relatively high electrolytic solution absorption speed (e.g., ≤3.0×10$^2$ seconds) is desirable since less time is required for the separator to uptake the electrolyte during battery manufacturing, which in turn increases the rate at which the batteries can be produced.

Electrochemical Stability

Electrochemical stability is a membrane property related to the membrane's resistance to oxidation when the membrane is used as a BSF in a battery exposed to relatively high-temperature storage or use. Electrochemical stability has the units of mAh, and a lower value, representing less integrated charge loss during high-temperature storage or overcharging, is generally desired. For automotive batteries, such as those used for starting or powering motor means for moving an electric vehicle or hybrid electric vehicle, and for power tool batteries, an electrochemical stability ≤50.0 mAh is desired since those relatively high-power, high capacity applications are particularly sensitive to any loss in battery capacity, such as self-discharge losses resulting from electrochemical instability of the BSF. The term "High-capacity" batteries generally means batteries capable of supplying 1.0 Ampere hour (1.0 Ah) or more, e.g., 2.0 Ah to 3.6 Ah. Optionally, the thermoplastic film has an electrochemical stability ≤40.0 mAh, e.g., in the range of 1.0 mAh to 35.0 mAh.

To measure membrane storage stability, a membrane having a length (MD) of 70 mm and a width (TD) of 60 mm is located between and anode and cathode having the same planar dimensions as the membrane. The anode is made of natural graphite and the cathode is made of LiCoO$_2$. An electrolyte is prepared by dissolving LiPF$_6$ into a mixture of ethylene carbonate (EC) and methylethyl carbonate (EMC) (4/6, V/V) as 1 M solution. The electrolyte is impregnated into the membrane in the region between the anode and the cathode to complete the battery.

The battery is then exposed to an applied voltage of 4.3V while exposed to a temperature of 60° C. for 21 days. Electrochemical stability is defined as the integrated current (in mAh) flowing between the voltage source and the battery over the 21 day period.

Absorbed Water

When the skin layers of the membrane comprise >85.0 wt. % polypropylene, the membrane is generally exposed to a hydrophilizing treatment in order to increase the membrane's electrolytic solution absorption speed (a characteristic of electrolyte affinity). Membranes having an electrolytic solution absorption speed $>3.0 \times 10^2$ generally have insufficient electrolyte affinity for use as a BSF. Conventional hydrophilizing treatments can be used to improve the membrane's electrolyte affinity. Such hydrophilizing treatments are undesirable because they increase the amount of water absorbed by the membrane from the atmosphere and the absorbed water can produce undesirable by-products of water reactions in the battery during manufacturing, storage, and use. In an embodiment, the membrane is not exposed to a hydrophilizing treatment after dry orientation or heat setting. In an embodiment, the amount of absorbed water in the membrane "as manufactured" and following a 24 hour exposure to the atmosphere at a temperature of 25.0° C. and 50.0% relative humidity is ≤10.0%, e.g., ≤5.0% or ≤1.0%, such as in the range of 0.05% to 5.0%. The amount of absorbed water is defined as an "intrinsic amount of absorbed water" when the amount of absorbed water is measured after the atmospheric exposure and before any heating of the membrane that would cause a decrease in the amount of absorbed water.

Absorbed water can be measured by thermogravimetric analysis ("TGA"). A membrane sample is placed on a platinum pan and exposed to flowing nitrogen atmosphere at a starting temperature of 20.0° C. The temperature is then increased at a ramp rate of 20.0° C. per minute to a final temperature of 600.0° C. while recording the sample weight. TGA model Q500 available from TA Instruments is suitable. The amount of absorbed water is determined by the loss of weight of the membrane sample between 95.0° C. and 105.0° C., expressed as a weight percent based on the total weight of the membrane sample at the start of the measurement.

The thermoplastic film is permeable to liquid (aqueous and non-aqueous) at atmospheric pressure. Thus, the microporous membrane can be used as a battery separator, filtration membrane, etc. The thermoplastic film is particularly useful as a BSF for a secondary battery, such as a nickel-hydrogen battery, nickel-cadmium battery, nickel-zinc battery, silver-zinc battery, lithium-ion battery, lithium-ion polymer battery, etc. In an embodiment, the invention relates to lithium-ion secondary batteries containing BSF comprising the thermoplastic film. Examples of such batteries are described in PCT publication WO 2008/016174, which is incorporated by reference herein in its entirety.

This invention will be described in more detail with reference to Examples below without intention of restricting the scope of this invention.

EXAMPLES OF THE INVENTION

Example 1

(1) Preparation of a First Mixture

A first polyolefin composition is prepared by dry-blending (a) 30 wt. % of a first polyethylene resin ("PE1") having an Mw of $7.5 \times 10^5$ and an MWD of 11.9 and (b) 40 wt. % of an isotactic polypropylene resin ("PP") having an Mw of $1.1 \times 10^6$, a heat of fusion of 114 J/g and an MWD of 5, the percentages being based on the weight of the first polyolefin composition. The PE1 has a Tm of 135° C. and a Tcd of 100° C. The polypropylene has a Tm≥160.0° C.

25 wt. % of the resultant first polyolefin composition is charged into a first strong-blending double-screw extruder having an inner diameter of 58 mm and L/D of 42, and 75 wt. % of liquid paraffin (50 cst at 40° C.) is supplied to the double-screw extruder via a side feeder to produce a first mixture, the weight percents being based on the weight of the first mixture. Melt-blending is conducted at 210° C. and 200 rpm.

(2) Preparation of a Second Mixture

A second polyolefin composition is prepared in the same manner as the first by dry-blending (a) 60.0 wt. % of PE1 and (b) 40.0 wt. % of a second polyethylene resin ("PE2") having an Mw of $1.9 \times 10^6$ and an MWD of 5.1. The weight percents are based on the weight of the second polyolefin composition.

27.5 wt. % of the resultant second polyolefin composition is charged into a second strong-blending double-screw extruder having an inner diameter of 58 mm and L/D of 42, and 72.5 wt. % of liquid paraffin (50 cst at 40° C.) is supplied to the double-screw extruder via a side feeder to produce a second mixture; the weight percents being based on the weight of the second mixture. Melt-blending is conducted at 210° C. and 200 rpm.

(3) Production of Membrane

The first and second mixtures are supplied from their respective double-screw extruders to a three-layer-extruding T-die, and extruded therefrom to produce a layered extrudate of first mixture layer/second mixture layer/first mixture at a layer thickness ratio of 11.5/77/11.5. The extrudate is cooled while passing through cooling rollers controlled at 20° C., producing an extrudate in the form of a three-layer gel-like sheet. The gel-like sheet is biaxially stretched (simultaneously) in MD and TD while exposed to a temperature of 112.5° C. (the "biaxial stretching temperature") to a magnification factor of 5 fold in each of MD and TD by a tenter-stretching machine. The stretched sheet is then exposed to a temperature of 95.0° C. (the "Wet Heat Set Temperature") while fixing the sheet's perimeter to a substantially constant width in TD. The stretched three-layer gel-like sheet is then fixed to an aluminum frame of 20 cm×20 cm, immersed in a bath of methylene chloride controlled at 25° C. for three minutes to remove the liquid paraffin, and dried by air flow at room temperature to produce a dried membrane. The dried membrane is then dry stretched. After liquid paraffin removal but before dry stretching, the dried membrane has an initial dry length (MD) and an initial dry width (TD). The dried membrane is dry-stretched in TD to a magnification of 1.2 fold (resulting in a second dry width) while exposed to a temperature of 122° C. (the "TD stretching temperature") without stretching in MD. In other words, the membrane's length (MD) remains approximately equal to the second dry length during the TD dry stretching. The membrane, which remains fixed to the batch-stretching machine, is then heat-set while exposed to a temperature of 122° C. (the "heat set temperature") for 10 minutes to produce the final multi-layer microporous membrane.

The polymers used to produce the membrane and representative process conditions are set out in Table 1.

Examples 2-5

Four additional microporous films are produced using the procedure described in Example 1. Starting materials, relative amounts, and process conditions are set out in Table 1. Except as shown in Table 1, the membranes are produced as described in Example 1. For example, in Example 5 the membrane is subjected to a controlled reduction in width from a magnification of 1.4 to 1.2 while holding the membrane's length substantially constant and while exposing the membrane to a temperature of 124.2° C.

Comparative Examples 1 and 2

Four microporous membranes were produced as described in Example 1, except as set out in Table 1.

TABLE 1

| | | Ex 1 | Ex 2 | Ex 3 | Ex 4 | Ex 5 |
|---|---|---|---|---|---|---|
| Skin Polymer (I) | | | | | | |
| PE1 | Mw | $7.5 \times 10^5$ | $7.5 \times 10^5$ | $5.6 \times 10^5$ | $5.6 \times 10^5$ | $5.6 \times 10^5$ |
| | MWD | 11.9 | 11.9 | 4.1 | 4.1 | 4.1 |
| | Wt. % | 30 | 30 | 55 | 50 | 50 |
| PE2 | Mw | — | — | $1.9 \times 10^6$ | — | — |
| | MWD | — | — | 5.1 | — | — |
| | Wt. % | — | — | 5 | — | — |
| PP | Mw | $1.1 \times 10^6$ | $1.1 \times 10^6$ | $1.1 \times 10^6$ | $1.1 \times 10^6$ | $1.1 \times 10^6$ |
| | MWD | 5 | 5 | 5 | 5 | 5 |
| | Wt. % | 70 | 70 | 40 | 50 | 50 |
| | ΔHm | 114 | 114 | 114 | 114 | 114 |
| Polymer concentration in first mixture (Wt. %) | | 25 | 25 | 25 | 35 | 35 |
| Core Polymer (II) | | | | | | |
| PE1 | Mw | $7.5 \times 10^5$ | $7.5 \times 10^5$ | $7.5 \times 10^5$ | $5.6 \times 10^5$ | $5.6 \times 10^5$ |
| | MWD | 11.9 | 11.9 | 11.9 | 4.1 | 4.1 |
| | Wt. % | 60 | 60 | 60 | 70 | 70 |
| PE2 | Mw | $1.9 \times 10^6$ | $1.9 \times 10^6$ | $1.9 \times 10^6$ | $1.9 \times 10^6$ | $1.9 \times 10^6$ |
| | MWD | 5.1 | 5.1 | 5.1 | 5.1 | 5.1 |
| | Wt. % | 40 | 40 | 40 | 30 | 30 |
| Polymer concentration in second mixture (Wt. %) | | 27.5 | 27.5 | 27.5 | 28.5 | 28.5 |
| Total membrane composition | | | | | | |
| Layer structure | | (I)/(II)/(I) | (I)/(II)/(I) | (I)/(II)/(I) | (I)/(II)/(I) | (I)/(II)/(I) |
| Extrudate layer thickness ratio | | 11.5/77/11.5 | 11.5/77/11.5 | 11.5/77/11.5 | 23.5/57/23.5 | 18/64/18 |
| Stretching of Gel-Like sheet | | | | | | |
| Temperature (° C.) | | 112.5 | 118.5 | 118.5 | 118 | 116 |
| Magnification (MD × TD) | | 5 × 5 | 5 × 5 | 5 × 5 | 5 × 5 | 5 × 5 |
| Wet Heat Set Treatment | | | | | | |
| Temperature (° C.) | | 95.0 | 95.0 | 95.0 | 95.0 | 95.0 |
| Time (sec) | | 600 | 600 | 600 | 600 | 600 |
| Stretching of dried membrane | | | | | | |
| Temperature (° C.) | | 122.0 | 122.0 | 124.0 | 123.2 | 124.2 |
| Magnification (TD) | | 1.2 | 1.2 | 1.2 | 1.30 | 1.4–>1.2 |
| Heat set treatment | | | | | | |
| Temperature (° C.) | | 122.0 | 122.0 | 124.0 | 123.2 | 124.2 |
| Time (sec) | | 600 | 600 | 600 | 600 | 600 |
| Hydrophilizing treatment (Yes/No) | | no | no | no | no | no |

| | | Comp Ex 1 | Comp Ex 2 | Comp Ex 3 | Comp Ex 4 |
|---|---|---|---|---|---|
| Skin Polymer (I) | | | | | |
| PE1 | Mw | $5.6 \times 10^5$ | $5.6 \times 10^5$ | — | $5.6 \times 10^5$ |
| | MWD | 4.1 | 4.1 | — | 4.1 |
| | Wt. % | 50 | 50 | — | 50 |
| PE2 | Mw | — | — | — | — |
| | MWD | — | — | — | — |
| | Wt. % | — | — | — | — |
| PP | Mw | $1.1 \times 10^6$ | $1.1 \times 10^6$ | $5.3 \times 10^5$ | $1.1 \times 10^6$ |
| | MWD | 5 | 5 | 5 | 5 |
| | Wt. % | 30 | 30 | 100 | 50 |
| | ΔHm | 85 | 85 | 85 | 85 |
| Polymer Concentration in first mixture (Wt. %) | | 25 | 25 | 67 | 35 |
| Core Polymer (II) | | | | | |
| PE1 | Mw | $5.6 \times 10^5$ | $5.6 \times 10^5$ | $3.0 \times 10^5$ | $5.6 \times 10^5$ |
| | MWD | 4.1 | 4.1 | 8.6 | 4.1 |

TABLE 1-continued

|  |  |  |  |  |  |
|---|---|---|---|---|---|
| PE2 | Wt. % | 70 | 70 | 95 | 100 |
|  | Mw | $1.9 \times 10^6$ | $1.9 \times 10^6$ | $2.0 \times 10^6$ | — |
|  | MWD | 5.1 | 5.1 | 8 | — |
|  | Wt. % | 70 | 70 | 5 | — |
| Polymer Concentration in Second Mixture (Wt. %) |  | 28.5 | 28.5 | 67 | 58 |
| Total membrane composition |  |  |  |  |  |
| Layer structure |  | (I)/(II)/(I) | (I)/(II)/(I) | (I)/(II)/(I) | (I)/(II)/(I) |
| Extrudate layer thickness ratio |  | 15.5/69/15.5 | 19.5/61/19.5 | 6.0/88/6.0 | 10/80/10 |
| Stretching of Gel-Like sheet |  |  |  |  |  |
| Temperature (° C.) |  | 114.5 | 114.5 | 117 | 117 |
| Magnification (MD × TD) |  | 5 × 5 | 5 × 5 | 5 × 5 | 5 × 5 |
| Wet Heat Set Treatment |  |  |  |  |  |
| Temperature (° C.) |  | 95.0 | 95.0 | — | — |
| Time (sec) |  | 600 | 600 | — | — |
| Stretching of dried membrane |  |  |  |  |  |
| Temperature (° C.) |  | 127 | 127 | 127 | 127 |
| Magnification (TD) |  | 1.22 | 1.22 | 1.4 | 1.4 |
| Heat set treatment |  |  |  |  |  |
| Temperature (° C.) |  | 127 | 127 | 127 | 127 |
| Time (sec) |  | 600 | 600 | 600 | 600 |
| Hydrophilizing treatment (Yes/No) |  | no | no | yes | no |

The properties of the membranes of Examples 1-5 and Comparative Examples 1-4 are set out in Table 2

TABLE 2

| Properties | Ex 1 | Ex 2 | Ex 3 | Ex 4 | Ex 5 |
|---|---|---|---|---|---|
| Thickness (μm) | 20.0 | 20 | 20 | 20 | 20 |
| Air Perm. (sec/100 cm³/20 μm) | 280 | 410 | 290 | 380 | 340 |
| Porosity (%) | 49 | 48 | 45 | 48 | 45 |
| Punct. Strength (mN/20 μm) | 3724 | 5586 | 4018 | 4410 | 4018 |
| Tensile Strength MD/TD (kPa) | 83356 88259 | 132389 132389 | 98066 102969 | 98066 102969 | 98066 102969 |
| Tensile Elongation MD/TD (%) | 160 150 | 150 150 | 190 180 | 150 160 | 180 180 |
| Heat Shrinkage 105° C. MD/TD (%/%) | 8.0 10.0 | 8.5 12 | 7.0 8.0 | 6.6 2.8 | 7.0 8.0 |
| Heat Shrinkage 120° C. MD/TD (%/%) | 9.0/7.0 | 9.0/12.0 | 6.0/7.0 | 4.0/0.0 | 6/7 |
| Max. Shrinkage in Molten State (%) MD/TD | 16.0 17.0 | 29.0 32.0 | 18.0 21.0 | 12 12 | 18 21 |
| Electrolytic Solution Absorption Speed | ≤$3.0 \times 10^2$ | ≤$3.0 \times 10^2$ | 271 | ≤$3.0 \times 10^2$ | ≤$3.0 \times 10^2$ |
| Shutdown Temp. (° C.) ←MD/TD→ | 131.1/131.4 | 130.7/130.8 | 130.7/130.8 | 133.6/133.5 | 130.7/130.8 |
| Meltdown Temp. (° C.) ←MD/TD→ | 171.7/174.8 | 178.0/182.4 | 173.5/178.5 | 179.5/178.1 | 173.5/178.5 |
| Electrochemical Stability (mAh) | 20 | 21 | 35 | 20 | 21 |
| Absorbed Water (wt. %) | ≤1.0 | ≤1.0 | ≤1.0 | ≤1.0 | ≤1.0 |

| Properties | Comp Ex 1 | Comp Ex 2 | Comp Ex 3 | Comp Ex 4 |
|---|---|---|---|---|
| Thickness (μm) | 20 | 20 | 21 | 20 |
| Air Perm. (sec/100 cm³/20 μm) | 310 | 300 | 314 | 355 |
| Porosity (%) | 45 | 44 | 41.3 | 43 |
| Punct. Strength (mN/20 μm) | 4900 | 4802 | 5439 | 4753 |
| Tensile Strength MD/TD (kPa) | 127486 122583 | 122583 117679 | 124950 162680 | 107800 140140 |
| Tensile Elongation MD/TD (%) | 140 130 | 130 140 | 120 110 | 120 110 |
| Heat Shrinkage 105° C. MD/TD (%/%) | 4.6 8.7 | 4.3 8.5 | 4.3 4.6 | 5.0 5.5 |
| Heat Shrinkage 120° C. MD/TD (%/%) | 3/8 | 2/7 | nm* | nm* |
| Max. Shrinkage in Molten State (%) MD/TD | 23 26 | 21 22 | nm* nm* | nm* nm* |

TABLE 2-continued

| | | | | |
|---|---|---|---|---|
| Electrolytic Solution Absorption Speed | >3.0 × 10² | >3.0 × 10² | >3.0 × 10² | >3.0 × 10² |
| Shutdown Temp. (° C.) MD/TD | 132.3/132.7 | 133.0/132.6 | nm* | nm* |
| Meltdown Temp. (° C.) MD/TD | 163.3/165.2 | 166.2/164.2 | 162 | 170 |
| Electrochemical Stability (mAh) | 52 | 56 | 33 | 47 |
| Absorbed Water (wt. %) | nm* | nm* | 26.32 | nm* |

*nm = not measured

Examples 1-5 show that the membranes of the invention have suitable properties; for use as BSFs. For example, the membranes of Examples 1-5 have a meltdown temperature ≥170° C., a normalize pin puncture strength ≥3.0×10³ mN/20 μm, an electrolytic solution absorption speed ≤3.0×10² seconds, an electrochemical stability ≤40.0 mAh, and an amount of absorbed water ≤1.0 wt. %. The membranes of Comparative Examples 1, 2 and 4 do not contain an isotactic polypropylene having an Mw>1.0×10⁶ in the skin layers, which leads to decreased meltdown temperature and an electrochemical stability >40.0 mAh. The membrane of Comparative Example 3 contains 100 wt. % polypropylene in the skin layer, but the amount of absorbed water causes undesirable by-products in the battery during production, storage, and use.

The multi-layer microporous membrane of the present invention have well-balanced properties, and the use of such multi-layer microporous membrane as a battery separator provides batteries having excellent safety, heat resistance, retention properties and productivity.

All patents, test procedures, and other documents cited herein, including priority documents, are fully incorporated by reference to the extent such disclosure is not inconsistent and for all jurisdictions in which such incorporation is permitted.

While the illustrative forms disclosed herein have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of patentable novelty which reside herein, including all features which would be treated as equivalents thereof by those skilled in the art to which this disclosure pertains.

When numerical lower limits and numerical upper limits are listed herein, ranges from any lower limit to any upper limit are contemplated.

The invention claimed is:

1. A membrane comprising (a) a first layer, the first layer comprising 40.0 wt. % to 85.0 wt. % of an isotactic polypropylene based on the weight of the first layer, the isotactic polypropylene having an Mw≥6.0×10⁵; (b) a second layer comprising polyolefin; and (c) a third layer comprising 40.0 wt. % to 85.0 wt. % of an isotactic polypropylene based on the weight of the third layer, the isotactic polypropylene having an Mw≥6.0×10⁵; wherein the membrane is microporous; and wherein the second layer is located between the first and third layers.

2. The membrane of claim 1, wherein the first layer further comprises 15.0 wt. % to 60.0 wt. % of a first polyethylene having an Mw≤1.0×10⁶ and ≤45.0 wt. % a second polyethylene having an Mw>1.0×10⁶, the weight percents being based on the weight of the first layer, and wherein the first and third layers have substantially equal thickness and substantially the same composition.

3. The membrane of claim 2, wherein the membrane has an electrochemical stability ≤1.0×10² mAh, a meltdown temperature ≥170.0° C., an electrolytic solution absorption speed ≤3.0×10² seconds, and an absorbed water content ≤10.0 wt. %, based on the weight of the membrane.

4. The membrane of claim 2, wherein the second layer comprises 55.0 wt. % to 75.0 wt. % of the first polyethylene and 25.0 wt. % to 45.0 wt. % of the second polyethylene, based on the weight of the second layer, and wherein the first polyethylene has a melting point ≥132.0° C. and the second polyethylene has a melting point ≥134.0° C.

5. The membrane of claim 2, wherein the polypropylene has an Mw in the range of from 0.9×10⁶ to 2.0×10⁶, an MWD≤6.0, and a ΔHm≥90.0 J/g.

6. The membrane of claim 5, wherein the polypropylene has an elongational viscosity of at least 5.0×10⁵ Pa sec at a temperature of 230° C. and a strain rate of 25 sec⁻¹; a Trouton's ratio of at least 15 when measured at a temperature of 230° C. and a strain rate of 25 sec⁻¹; an MFR≤0.01 dg/min; and an amount extractable species ≤0.5 wt. % based on the weight of the polypropylene.

7. The membrane of claim 2, wherein (a) the second layer is in contact with the first layer and the third layer; (b) the membrane's total thickness is in the range of 10.0 μm to 25.0 μm; (c) the second layer has a thickness of 70.0% to 90.0% of the membrane's total thickness; and (d) the thickness of the first and third layers is each in the range of 5.0% to 15.0% of the membrane's total thickness.

8. The membrane of claim 1, wherein the membrane has one or more of a normalized permeability ≤6.5×10² seconds/100 cm³/20 μm, a porosity ≥25%, a normalized pin puncture strength ≥2.0×10³ mN/20 μm, an MD tensile strength ≥8.5×10⁴ kPa, a TD tensile strength ≥8.0×10⁴ kPa, MD tensile elongation ≥50%, a TD tensile elongation ≥50.0%, an electrolytic solution absorption speed ≤2.5×10² seconds, and an electrochemical stability ≤50.0 mAh.

9. The membrane of claim 2, wherein the first layer comprises 65.0 wt. % to 75.0 wt. % of the polypropylene, wherein the second layer comprises ≤10.0 wt. % polypropylene, and wherein the membranes 105° C. heat shrinkage ≤1.0% in at least one planar direction.

10. A method for producing a microporous membrane, comprising,
(a) forming a first mixture comprising a first diluent and a first polymer, the first polymer comprising 40.0 wt. % to 85.0 wt. % of an isotactic polypropylene based on the weight of the first polymer, the isotactic polypropylene having an Mw≥6.0×10⁵;
(b) forming a second mixture comprising a second diluent and a second polymer;

(c) forming a third mixture comprising a third diluent and a third polymer, the third polymer comprising 40.0 wt. % to 85.0 wt. % of a isotactic polypropylene based on the weight of the third polymer, the isotactic polypropylene having an Mw≥6.0×10$^5$;

(d) producing a sheet comprising a first layer comprising the first mixture, a third layer comprising the third mixture, and a second layer comprising the second mixture, the second layer being located between the first and third layers; and (e) removing at least a portion of the first, second, and third diluents from the sheet.

11. The method of claim 10, wherein the first and third mixtures comprise 50.0 wt. % to 70.0 wt. % of the isotactic polypropylene, and wherein the isotactic polypropylene has a ΔHm≥90.0 J/g, an Mw in the range of 0.9×10$^6$ to 2.0×10$^6$, and an MWD in the range of 2.0 to 6.0.

12. The method of claim 10, wherein the first mixture further comprises ≥15.0 wt. % of a first polyethylene having an Mw≤1.0×10$^6$ and ≤45.0 wt. % a second polyethylene having an Mw>1.0×10$^6$, the weight percents being based on the weight of the first mixture.

13. The method of claim 12, wherein the second polymer comprises 55.0 wt. % to 75.0 wt. % of the first polyethylene and 25.0 wt. % to 45.0 wt. % of the second polyethylene, based on the weight of the second polymer.

14. The method of claim 13, wherein the second layer further comprises polypropylene.

15. The method of claim 10, further comprising stretching the sheet in at least one direction before and/or after step (e), the stretching after step (e) being conducted while the sheet is exposed to a temperature in the range of 119° C. to 128° C.

16. A battery comprising an anode, a cathode, an electrolyte, and at least one separator located between the anode and cathode, the separator comprising first and third layers of substantially equal thickness and a second layer located between the first and third layers, the first and third layers each comprising (i) 40.0 wt. % to 85.0 wt. % of an isotactic polypropylene having an Mw≥5.0×10$^5$, an MWD in the range of from about 2.0 to about 6.0, and a ΔHm≥90.0 J/g, (ii) 15.0 wt. % to 60.0 wt. % of a first polyethylene having an Mw≤1.0×10$^6$, and (iii) ≤45.0 wt. % a second polyethylene having an Mw>1.0×10$^6$ based on the weight of the layer; the second layer comprising (i) 55.0 wt. % to 75.0 wt. % of the first polyethylene and (ii) 25.0 wt. % to 45.0 wt. % of the second polyethylene, based on the weight of the second layer.

* * * * *